US011320357B2

(12) United States Patent
Duke et al.

(10) Patent No.: US 11,320,357 B2
(45) Date of Patent: May 3, 2022

(54) SYSTEM AND METHOD FOR ESTIMATION OF ROCK PROPERTIES FROM CORE IMAGES

(71) Applicant: Chevron U.S.A. Inc., San Ramon, CA (US)

(72) Inventors: Paul Duke, Houston, TX (US); Bo Gong, Houston, TX (US); Paul Hart, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 133 days.

(21) Appl. No.: 16/724,830

(22) Filed: Dec. 23, 2019

(65) Prior Publication Data

US 2021/0190664 A1    Jun. 24, 2021

(51) Int. Cl.
*G01N 15/08* (2006.01)
*G06T 7/30* (2017.01)
*G06T 3/40* (2006.01)

(52) U.S. Cl.
CPC ......... *G01N 15/08* (2013.01); *G06T 3/4007* (2013.01); *G06T 7/30* (2017.01); *G01N 2015/0846* (2013.01); *G06T 2207/20081* (2013.01); *G06T 2207/20132* (2013.01)

(58) Field of Classification Search
CPC .. G01N 15/08; G01N 2015/0846; G06T 7/30; G06T 3/4007; G06T 2207/20081; G06T 2207/20132
See application file for complete search history.

(56) References Cited

U.S. PATENT DOCUMENTS

| 8,908,925 | B2 * | 12/2014 | Hurley | E21B 49/00 |
| | | | | 382/109 |
| 10,096,109 | B1 | 10/2018 | Zaharchuk et al. | |
| 10,198,804 | B2 * | 2/2019 | Sungkorn | G06K 9/00201 |
| 10,628,943 | B2 * | 4/2020 | Hsieh | G06T 7/0012 |
| 11,060,391 | B2 * | 7/2021 | Ramsay | G01V 8/02 |
| 11,093,576 | B2 * | 8/2021 | Sung | G01V 99/005 |
| 2009/0259446 | A1 * | 10/2009 | Zhang | G06F 30/20 |
| | | | | 703/2 |
| 2017/0193680 | A1 | 7/2017 | Zhang et al. | |

(Continued)

OTHER PUBLICATIONS

EP Search Report, dated Apr. 22, 2021, issued in EP Application No. 20216622.9, filed on Dec. 22, 2020, 11 pages.
(Continued)

*Primary Examiner* — Gregory M Desire
(74) *Attorney, Agent, or Firm* — Marie L. Clapp

(57) ABSTRACT

A method is described for training a model that refines estimated parameter values within core images is disclosed. The method includes receiving multiple training image pairs wherein each training image pair includes: (i) an unrefined core image of a rock sample to be used for estimating rock properties, and (ii) a refined core image of the same rock sample; generating a training dataset from the multiple training image pairs; receiving an initial core model; generating a conditioned core model by training, using the multiple training image pairs, the initial core model; and storing the conditioned core model in electronic storage. The conditioned core model may be applied to an initial target core image data set to generate a refined target sore image dataset. The method may be executed by a computer system.

10 Claims, 12 Drawing Sheets

4 inch full core    1 inch plug    8 mm mini plug    SEM and Confocal
Resolution: 127μm   Resolution: 22.7μm   Resolution: 3.5μm   Resolution: 0.25μm 11   12   13   14

(56) References Cited

U.S. PATENT DOCUMENTS

| | | | |
|---|---|---|---|
| 2019/0266501 A1* | 8/2019 | Tavares | G01V 99/005 |
| 2019/0302290 A1* | 10/2019 | Alwon | G01V 1/364 |
| 2020/0111194 A1* | 4/2020 | Wang | G06T 3/4076 |
| 2021/0190664 A1* | 6/2021 | Duke | G06T 3/4007 |

OTHER PUBLICATIONS

Wang Ying Da et al.; "Enhancing Resolution of Digital Rock Images with Super Resolution Convolutional Neural Networks," Journal of Petroleum Science and Engineering, vol. 182, Jul. 12, 2019, Elsevier, Amsterdam, NL.

Wang Yuzhu et al.; "Porous Structure Reconstruction Using Convolutional Neural Networks," Mathematics Geosciences, vol. 50, No. 7, May 18, 2018, Springer, Berlin Heidelberg.

Wang Yukai et al.; "CT-Image of Rock Samples Super Resolution Using 3D Convolutional Neural Network," Computers & Geosciences, vol. 133, Aug. 16, 2019, Pergamon, Amsterdam, NL.

* cited by examiner

SYSTEM AND METHOD FOR ESTIMATION OF ROCK PROPERTIES FROM CORE IMAGES

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The disclosed embodiments relate generally to techniques for estimating pore-scale rock properties from core images representative of subsurface reservoirs and, in particular, to a method for estimating pore-scale rock properties from core images at resolutions below pore-scale.

BACKGROUND

Pore-scale rock properties can be estimated from two-dimensional or three-dimensional core images through calculation or numerical simulation. However, accuracy of the estimation is directly limited by the resolution of the applied imaging technique. In rocks with complex pore systems, the pixel or voxel sizes of the core images may not be sufficient to capture the details of pore spaces and pore connectivities, leading to uncertainties in determining properties like pore-size distribution, permeability and capillary pressure. Imaging at an extremely high resolution is time-consuming, and hence is usually done on selected small samples, the area or volume of which is often not large enough to represent the formation heterogeneity.

There exists a need for a method that can use relatively low-resolution core images to determine pore-scale rock properties with high accuracy in large rock volumes.

SUMMARY

In accordance with some embodiments, a method for training a model that refines estimated parameter values within core images is disclosed. The method includes receiving multiple training image pairs wherein each training image pair includes: (i) an unrefined core image of a rock sample to be used for estimating rock properties, and (ii) a refined core image of the same rock sample; generating a training dataset from the multiple training image pairs; receiving an initial core model; generating a conditioned core model by training, using the multiple training image pairs, the initial core model; and storing the conditioned core model in electronic storage. In an embodiment, the unrefined core image is created by coarsening the refined core image. In an embodiment, the unrefined core image is an image that was physically imaged at low-resolution and the refined core image is an image that was physically imaged at high-resolution. In an embodiment, the unrefined core image and the refined core image are aligned manually or algorithmically using an image registration method. In an embodiment, the unrefined core image and the refined core image are 2-D and the generating the training dataset includes one or more of cropping the images into sub-images and image interpolation. In an embodiment, the unrefined core image and the refined core image are 3-D core volumes represented as a stack of 2-D image slices and the generating the training dataset includes one of: representing each 2-D image slice independently as a 2-D grayscale image slice; representing slices as sequences of 2-D composite channel image slices wherein image channels represent a prior, a current, and a subsequent slice in the stack; or representing slices as 3-D multi-channel voxels of data. In an embodiment, the conditioned core model is one of general multi-layer convolutional models, generative adversarial networks (GANs), U-Net model variants, or related model types capable of performing image-to-image mapping.

In another embodiment, a method for refining estimated parameter values within core image data sets is disclosed. The method includes obtaining an initial target core image data set; obtaining a conditioned core model, the conditioned core model having been conditioned by training an initial core model, wherein training data includes (i) unrefined core image data sets specifying estimated parameter values and (ii) refined core image data sets specifying refined estimated parameter values within the corresponding subsurface volume of interest; applying the conditioned core model to the initial target core image data set to generate a refined target core image data set; generating a refined target core image that represents the refined target core image data set using visual effects to depict at least a portion of refined parameter values in the refined target core image data set; and displaying, on a graphical user interface, or storing, in electronic storage, the refined target core image.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Described below are methods, systems, and computer readable storage media that provide a manner of rock property estimation from core images. Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

Figure 1:
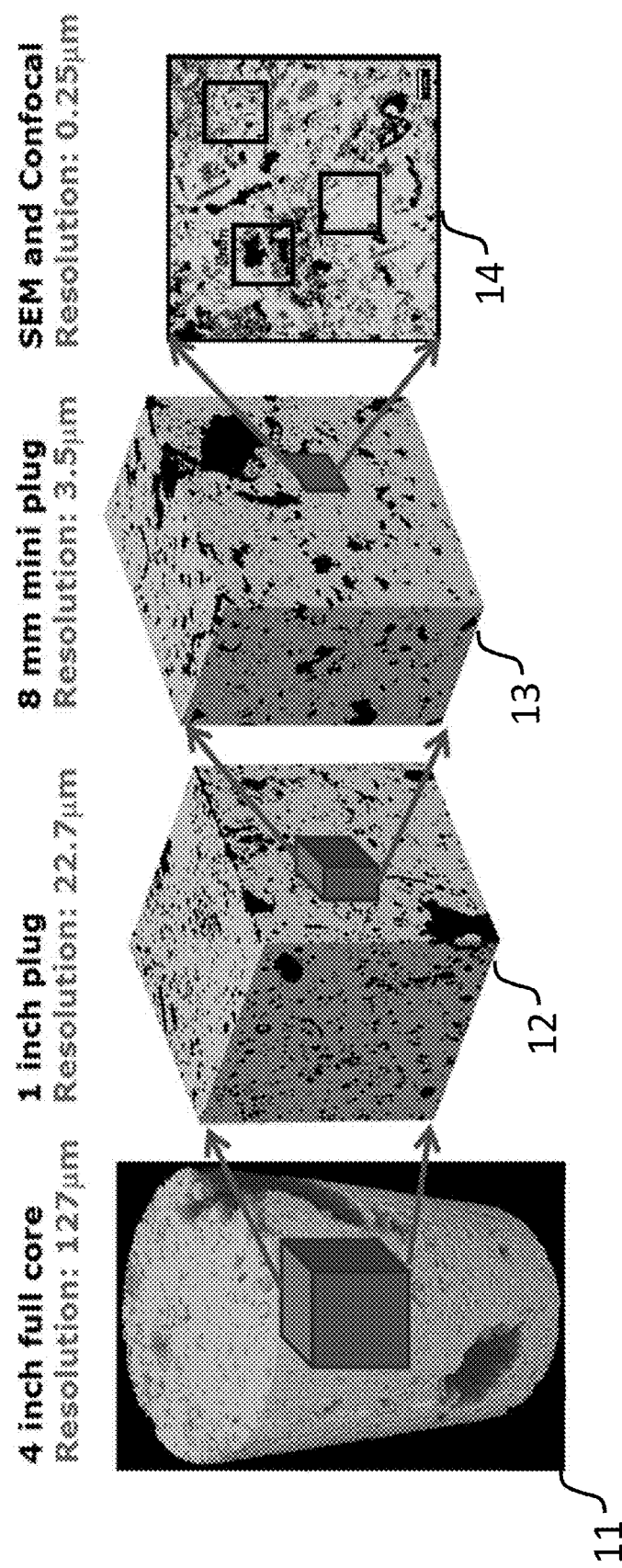
FIG. 1 demonstrates varying resolution and sample volumes on cores/core images.

Rock imaging techniques, like X-ray computed tomography (CT), microtomography (μCT), scanning electron microscopy (SEM), and confocal microscopy allow earth scientists to visualize and analyze rock samples in extremely fine detail. The ability to characterize micrometer- and nanometer-scale features, such as pore size, grain surface roughness, and mineral composition is critical for understanding fluid flow behaviors in subsurface reservoirs and impact reservoir production forecast and development decisions. Such rock sample images are used to reconstruct 3D models, on which numerical simulations can be conducted to study static and dynamic properties of the imaged rock systems via digital rock physics (DRP) technologies. Typically, the physical size of rock samples being imaged is directly linked to the resolution of the image: higher-resolution images are usually acquired on samples with smaller sizes, as they are relatively more expensive and time-consuming to acquire, store, and process with large samples. Lower-resolution data (coarser images) are more available on larger volumes, which may be more statistically representative for the properties of interest, but accuracy of the resulted interpretations may be compromised because of the loss of fine details. FIG. 1 illustrates the resolution and dimensions possible for various core-related samples. Image 11 is part of a 3D X-ray CT scan acquired on a 4-inch-diameter core at the resolution of 127 μm/voxel. Image 12 is part of a 3D μCT scan acquired on a 1-inch-diameter core plug at 22.7 μm/voxel. Image 13 is part of a 3D μCT scan acquired on an 8-mm-diameter mini core plug at 3.5 μm/voxel. Image 14 is an SEM image acquired on a thin slice of the mini core plug, within which three confocal microscopy images could be acquired on even smaller areas (rectangular boxes) at 0.25 μm/pixel. Enhancement on lower-resolution images will improve the characterization of detailed features on larger rock volumes, and hence increase the accuracy of the estimation of rock properties derived from such images.

Figure 2:
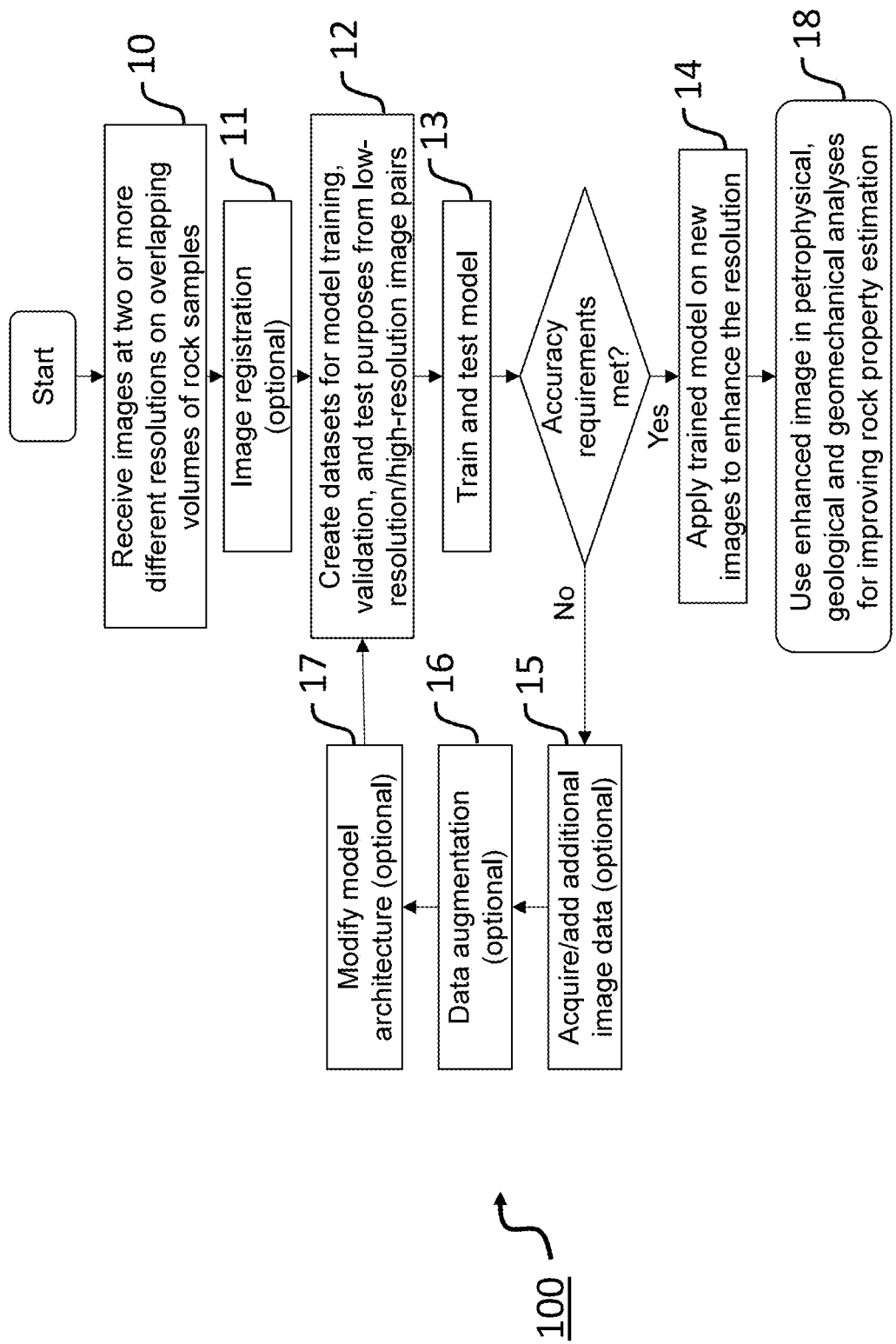
FIG. 2 illustrates a flowchart of a method of rock property estimation, in accordance with some embodiments.

FIG. 2 illustrates a flowchart of a method 100 for rock property estimation from core images. At operation 10, images of at least two different resolutions are obtained for at least one shared volume of rock samples. Embodiments described herein disclose a method for acquiring low-resolution/high-resolution image pairs to serve as the source for a model training set of images. These image pairs may come from two different processes: a) physically imaging the sample twice at two different resolutions; or b) deriving a low-resolution version of a high-resolution image by degrading the high-resolution image as described below. At least one of the lower resolutions is too low for pore-scale rock property estimation. At least one of the higher resolutions is desired for the purpose of estimating pore-scale rock properties such as pore size, pore throat diameter, and grain surface roughness.

Figure 3:
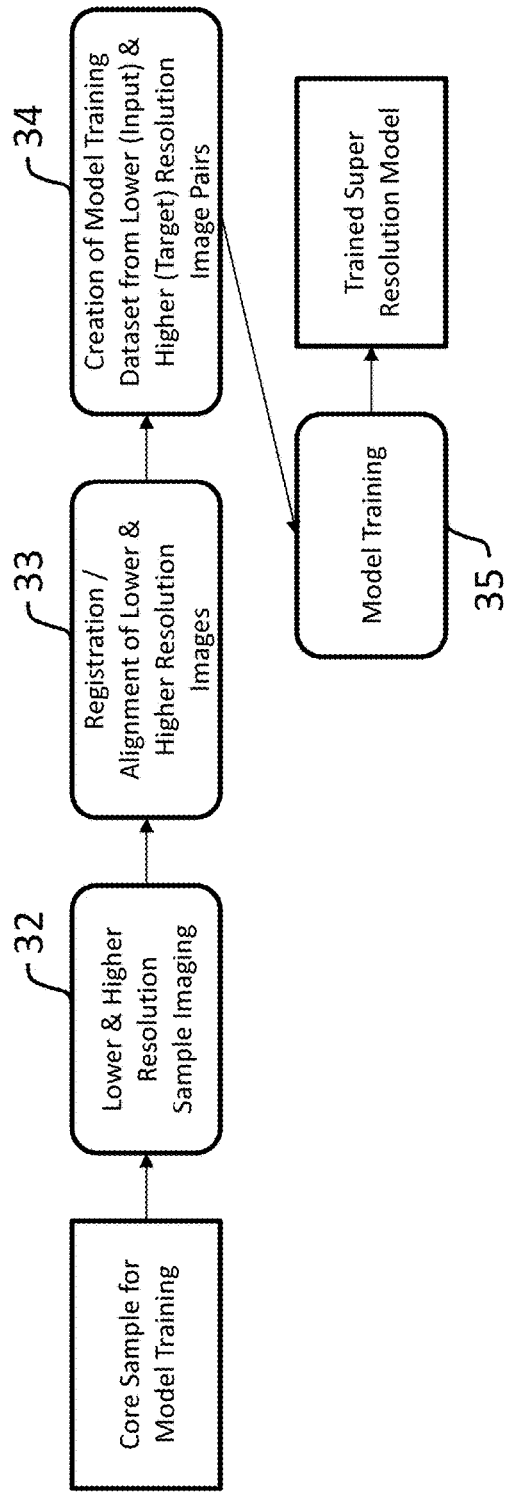
FIG. 3 demonstrates steps of the method of rock property estimation, in accordance with some embodiments.
Figure 4:
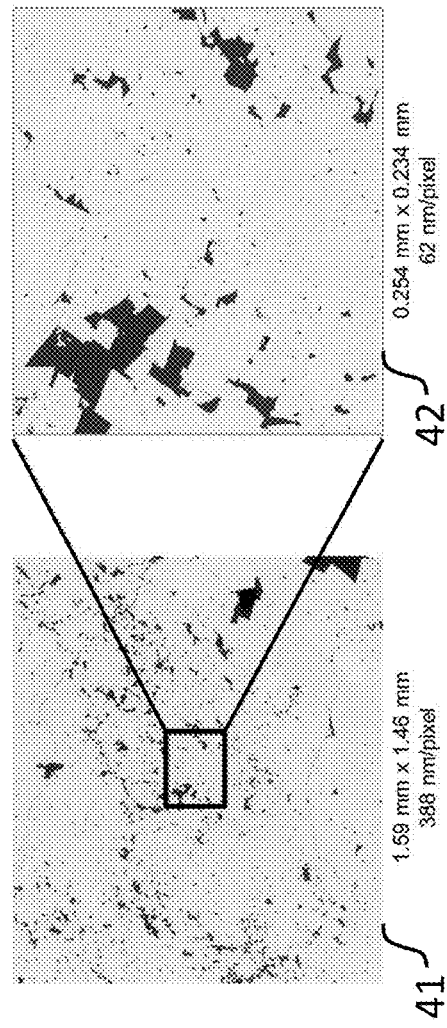
FIG. 4 illustrates a core rock sample imaged at two different resolutions, in accordance with some embodiments.

In one embodiment as presented in FIG. 3, in order to create data for training a core image super resolution model, a core slice or volume is imaged at both a high-resolution and a lower resolution 32. FIG. 4 illustrates an example of this, with SEM image 41 being the low resolution (388 nm/pixel) image on a relatively larger area of a rock sample (1.59 mm by 1.46 mm) and SEM image 42 being the high resolution (62 nm/pixel) image on a smaller area (0.254 mm by 0.234 mm, illustrated by the rectangular box) of what is covered by image 41. The part of image 41 within the rectangular box can then be used as an input image of the training data and image 42 can be used as a target image. While every effort is made to maintain consistency between the captured images, these are 2 separate imaging processes and it is possible that there can be variances in position, scale, and rotation between the high-resolution and the low-resolution imaging processes. Prior to creating a model training dataset, these variances must be minimized as much as possible in order to have corresponding high-resolution/low-resolution image pairs for the same sample.

Correcting this variance can be done manually or algorithmically. An image registration method 33 has been developed to search for the best set of correction parameters so that the high-resolution and low-resolution images represent the same rock area, shown as operation 11 in FIG. 2. For 2-D image slice pairs, this can involve changing the image scale, x-y position, and rotation of imaged rock area. For 3-D volume image stacks, we may additionally correct for z-position (depth).

Finding the appropriate corrections for image registration parameters may involve a deterministic, stochastic, or an exhaustive grid search of the parameter space or any combination of such methods for optimizing the parameters that will best align image pairs. The image registration loss/fitness function may entail calculating pixel level mean squared error or other image similarity measures such that the search algorithm can calculate the closeness of the parameter-corrected low-resolution/high-resolution match. For 3-D volume image stacks, the loss/fitness function can be calculated on any subset of corresponding images extracted from the image stacks based on the value of the z-position parameters as depicted in FIG. 6.

Figure 5:
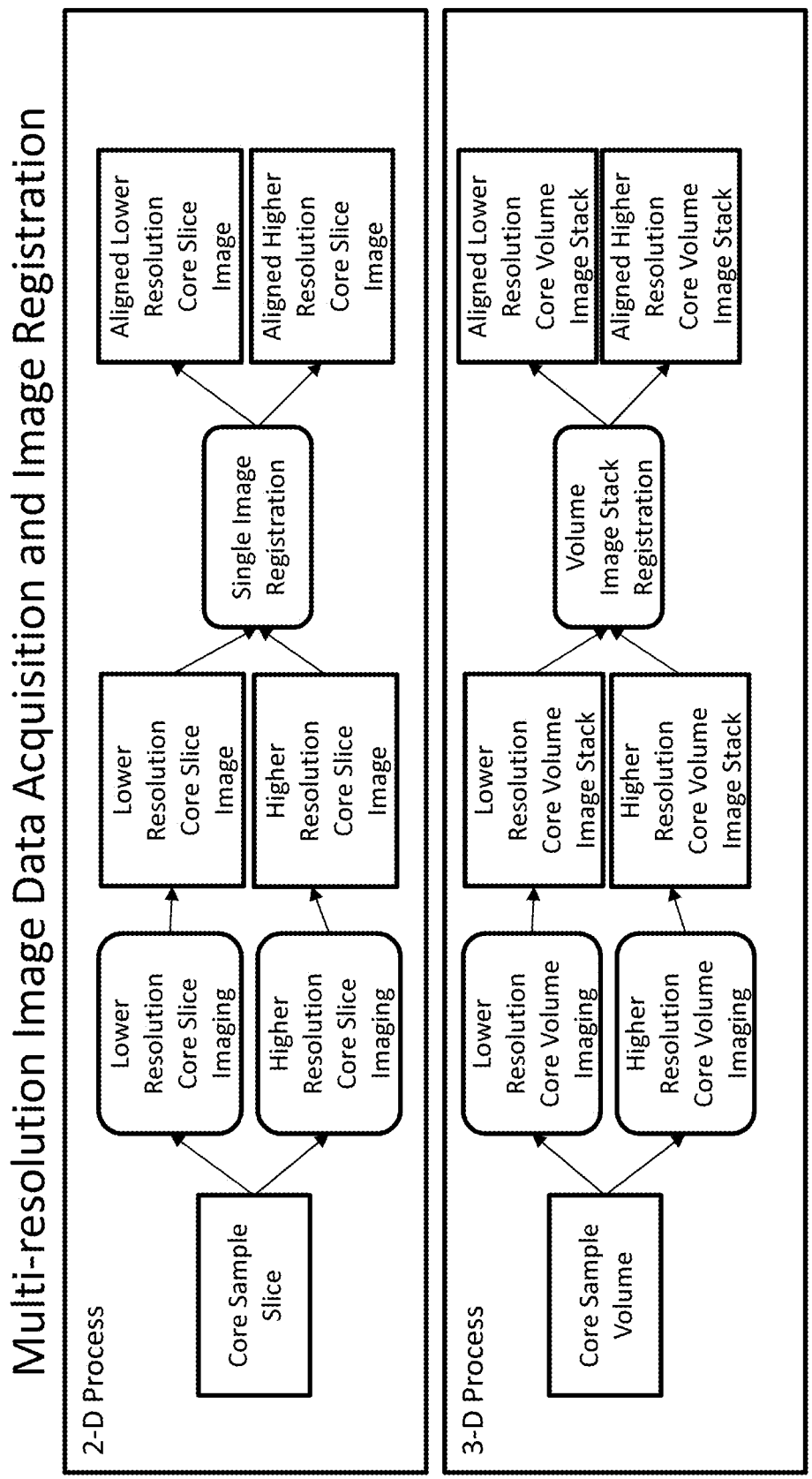
FIG. 5 demonstrates steps of the method of rock property estimation, in accordance with some embodiments.

FIG. 5 depicts the steps involved to obtain a pair of low-resolution and high-resolution images or volume image stacks from a rock sample. The sample is imaged twice—at a lower resolution and a higher resolution. For a single slice this results in 2 images. For a volume, this results in a stack of images representing a rock volume. These images must then be registered to determine any necessary shift, scaling, or rotation in order align the two different images or image stacks. Once aligned, this set of low-resolution/high-resolution image pairs can be used as the source for a rock core super resolution model training dataset.

Figure 6:
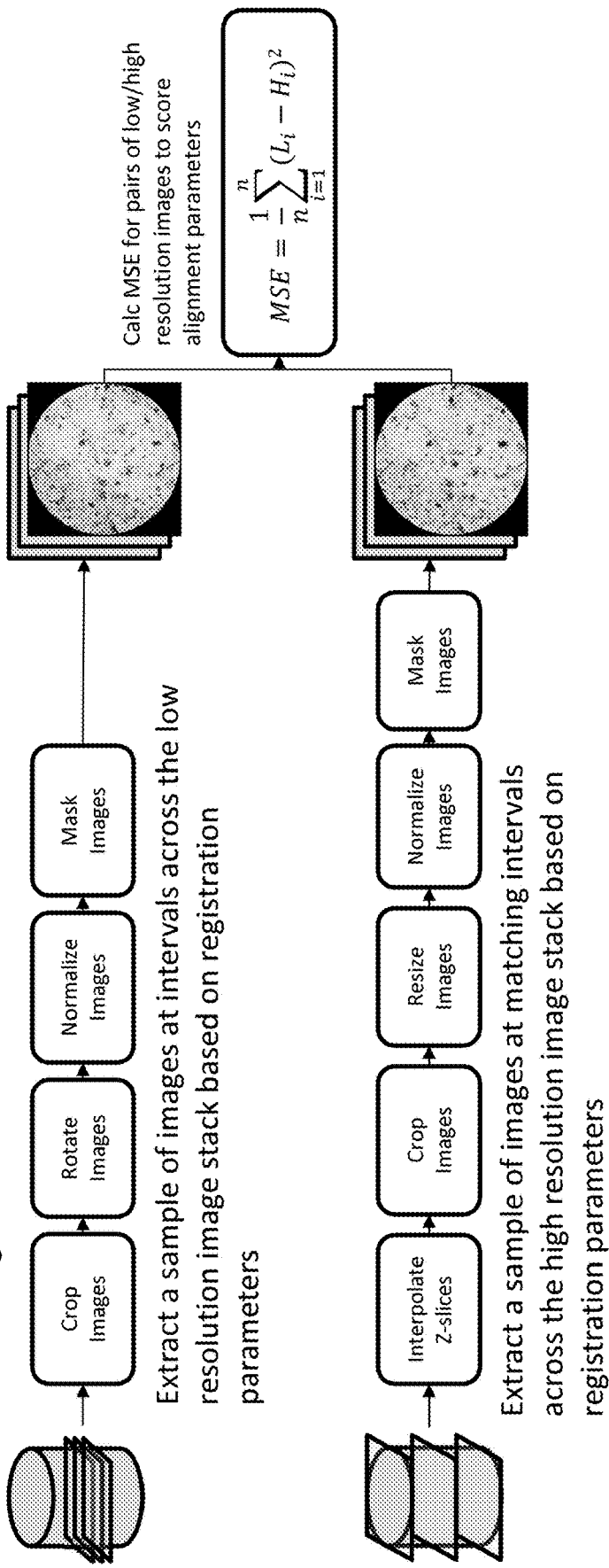
FIG. 6 demonstrates steps of the method of rock property estimation, in accordance with some embodiments.

FIG. 6 depicts a parameterized method for aligning 2 images or 2 image stacks and scoring how well they are aligned given a set of registration parameters. Parameters may allow for any number of adjustments to images or image stacks. In this depiction, the parameters describe how to adjust images in two different image stacks, including:

Position and spacing in z/depth of the high-resolution stack of images within the larger, low-resolution image stack How to crop images in both the high-resolution and low-resolution image stacks How to rotate the images in the low-resolution image stack Given a set of registration parameter values, any number of sample images can be generated at corresponding positions within each stack and scored to determine how well the stacks are aligned. In this depiction, pixel-wise mean squared error is calculated as the score. When searching for the best registration parameters this scoring method may be used as the loss or fitness function in a stochastic or gradient search algorithm.

Figure 7:
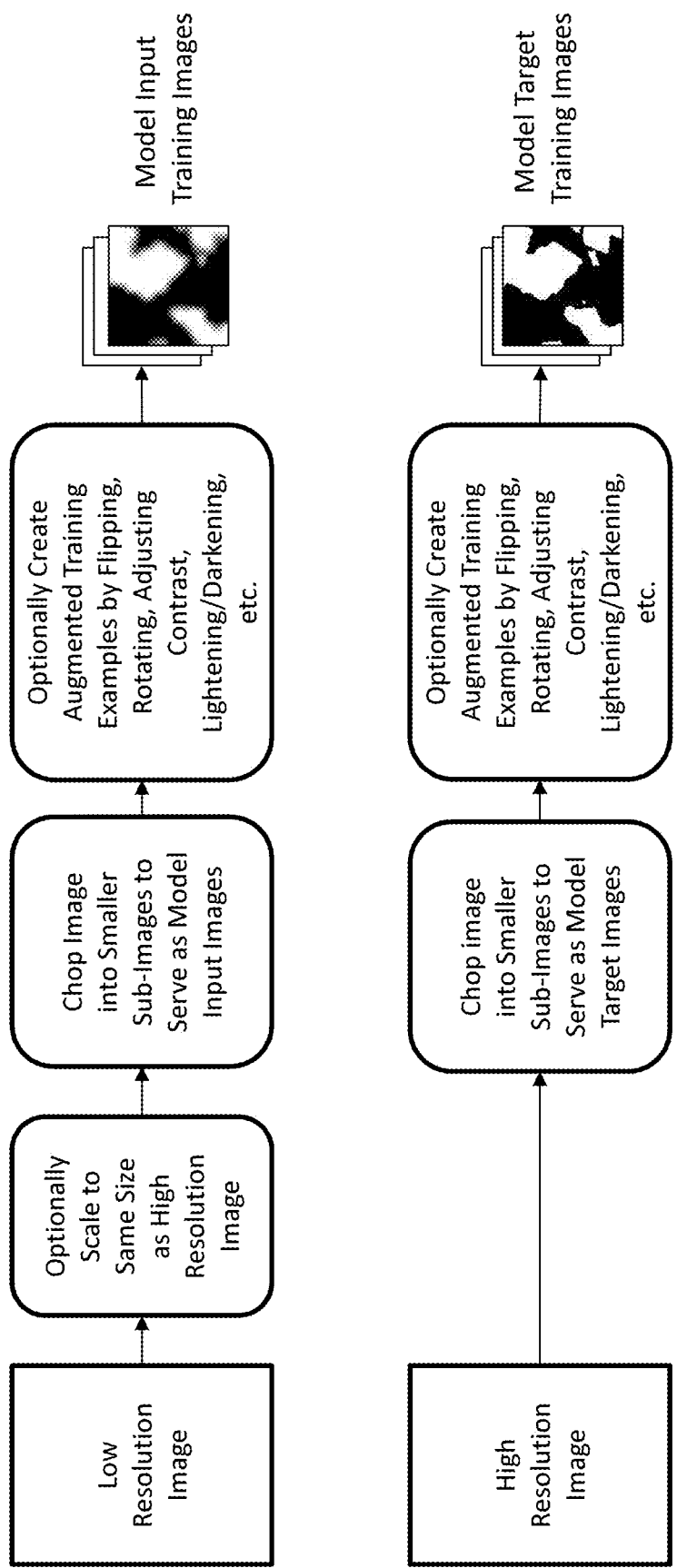
FIG. 7 demonstrates steps of the method of rock property estimation, in accordance with some embodiments.

Once the images are aligned, image/volume pairs can be extracted from the aligned low-resolution/high-resolution images 34 to create a training set for model training 35 of the super resolution model. FIG. 7 depicts one embodiment of steps for generating pairs of input training images and target training images from registered high-resolution, low-resolution image pairs. The low-resolution image is used as the source for model input training data and the high-resolution image is used as the source for model target training images. Since these images are often very large, in this embodiment, the images are chopped into a set of smaller sub-images. Sub-images may be randomly sampled from the large source images or may be regularly spaced with or without overlap. Optionally, the model training sub-images may be further augmented by image operations such as flipping, rotating, warping, lightening/darkening, adjusting contrast, and others in order to larger number of training image pairs with greater variation.

Figure 8:
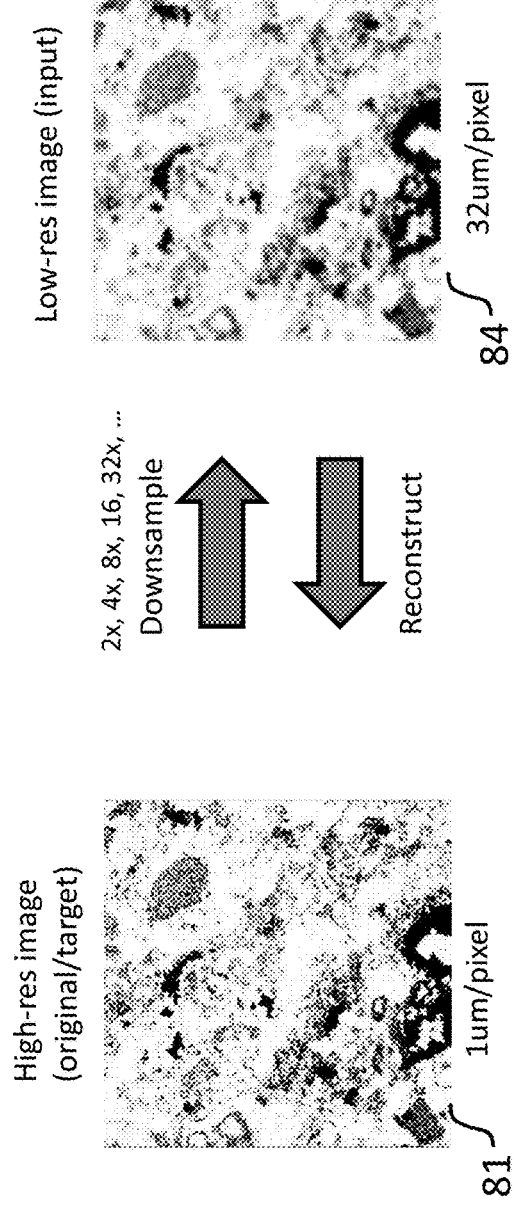
FIG. 8 demonstrates an example of a step of rock property estimation s, in accordance with some embodiments.

In another embodiment, synthetically created training data may be used. This may consist, for example, of high-resolution core images that have been coarsened by 2 times, 4 times, and so on, as demonstrated in FIG. 8. In FIG. 8, the original high-resolution image 81 is down-sampled 32 times to the low-resolution image 84. Examples of image coarsening techniques include but are not limited to averaging neighboring pixels/voxels, and randomly removing a number of pixels/voxels. Image 84 can then be used as an input image of the training data, and image 81 can be used as a target image of the training data. Synthetically blurred data has the advantage that the low-resolution image is perfectly aligned with the original high-resolution image such that no image registration is required. Additionally, the model designer can choose any specific blur level or a mix of blur levels as the source training data for training a model.

Figure 9:
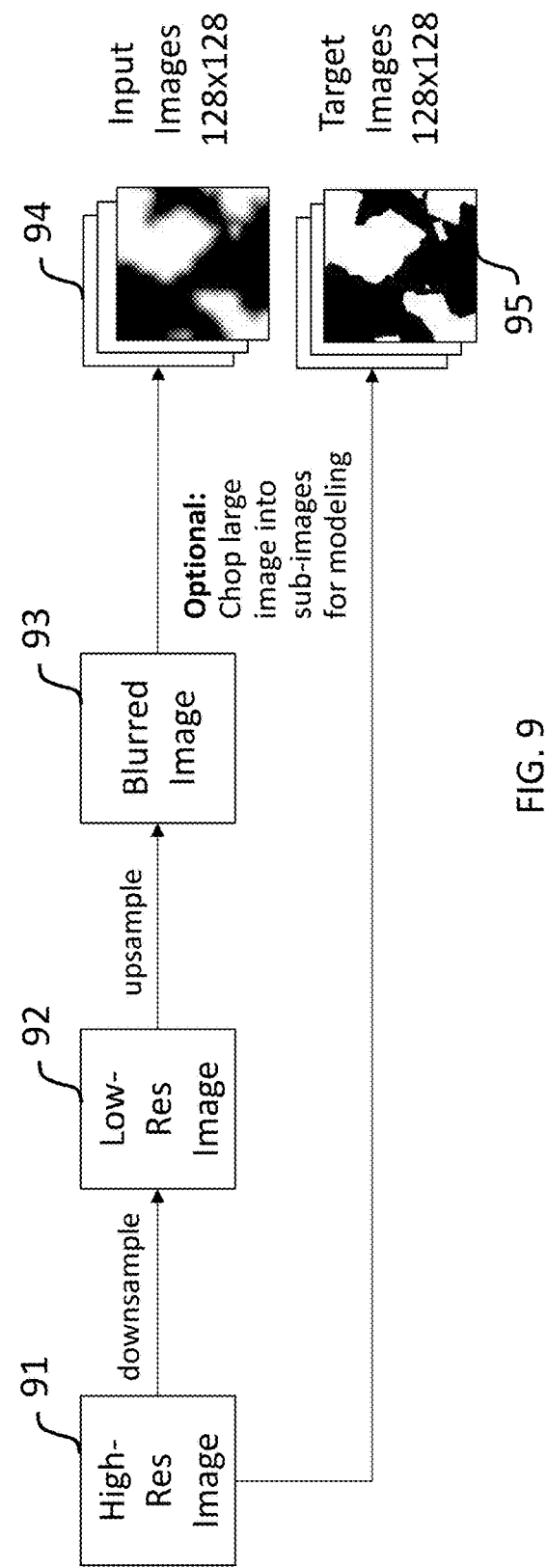
FIG. 9 demonstrates steps of the method of rock property estimation, in accordance with some embodiments.

FIG. 9 illustrates an example of how the synthetic training data may be obtained. The high-resolution image 91 may be down-sampled to create low-resolution image 92, which has fewer pixels/voxels than image 91. The small image 92 can then be up-sampled/resized to create blurred image 93, which matches the number of pixels/voxels with image 91 but provides less details. Image up-sampling can be done using algorithms such as nearest-neighbor interpolation, bilinear interpolation and bicubic interpolation. Then the high-resolution image 91 can be included as target images 95 of the training data. The blurred image 93 can be included as input images 94 of the training data. Alternatively, image 91 can be chopped into sub-images to generate a subset of the target images 95 of the training data. The blurred image 93 can also be chopped into sub-images to generate a subset of the input images 94 of the training data.

Referring again to FIG. 2, at operation 12, as is common practice in model training workflows, data may be separated into 3 datasets: a training dataset, a validation dataset, and a test dataset. The training dataset is directly used by the learning algorithm to adjust model weights. Model performance on the validation dataset is evaluated to optimize the configuration of the model, i.e., hyperparameter tuning and to prevent overfitting. The test dataset is used to assess how a trained model performs on new data, i.e., how well the trained model generalizes to new data not contained in the training or validation set. This can be done for 2-D data and/or 3-D data.

2D Image Training Dataset Creation

Once one or more low-resolution/high-resolution image pairs are acquired and aligned, a model training dataset can be created where the low-resolution version will be used as the model input image and the high-resolution image will be used as the model target. Since the source images can be very large, a model will generally be trained on smaller sub-images cropped from the larger whole images. The model input-output structure can be adjusted to match the sub-image size chosen by the model designer. The size selected will be determined by a variety of design factors such as memory, cpu/gpu training performance, runtime performance, etc. Typical sub-image sizes may range from 32×32 pixels to 512×512 pixels but are not limited to those sizes.

The lower resolution image will be smaller in size than the higher resolution image. The training data and model can be designed to increase the image size directly, for example, by taking a 32×32 pixel image as input and generating a 128×128 as output. This results in a model that is specifically designed to improve image resolution by a factor of 4.

Alternatively, the low-resolution source image may be resized via image interpolation to match the high-resolution target image size prior to creating the model training dataset such that the model will process an input/low-resolution sub-image which is the same size as the target/high-resolution sub-image. This has the advantage that a single model can be trained to correct for multiple resolution improvements.

Figure 10:
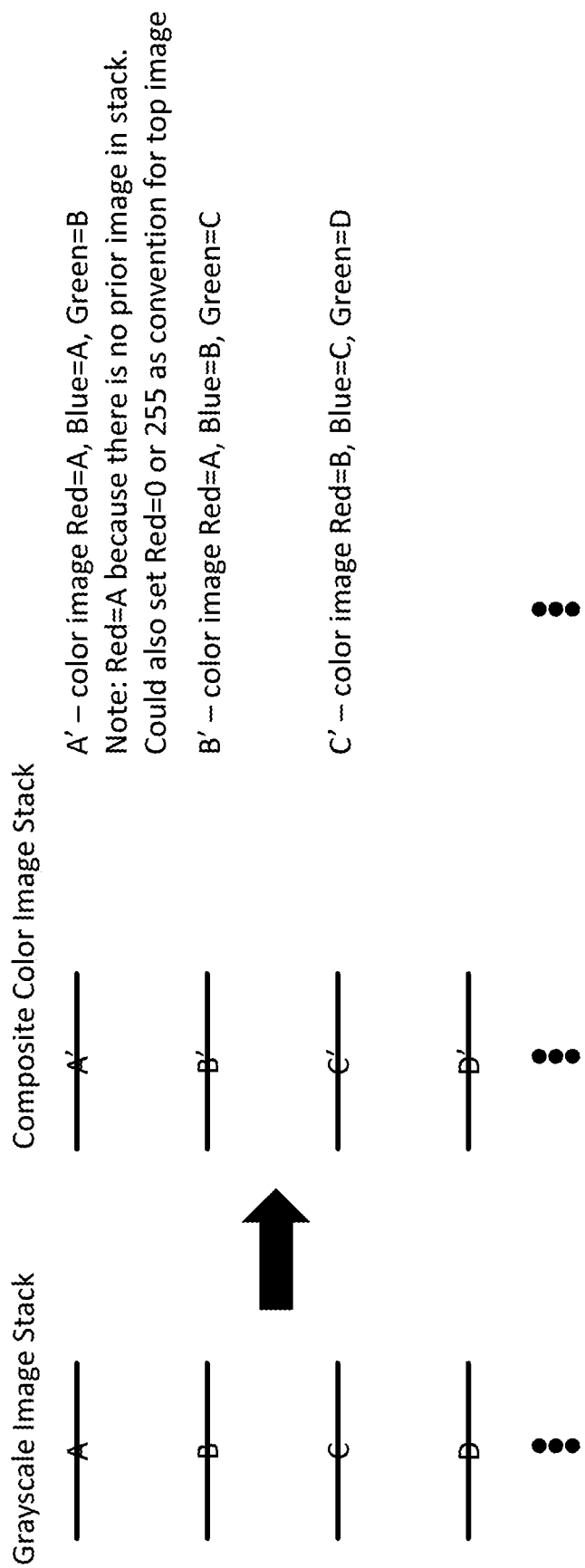
FIG. 10 demonstrates steps of the method of rock property estimation, in accordance with some embodiments.

3D Image Stack Training Dataset Creation 3D core volumes can be represented as stacks of 2D image slices captured at regular intervals. A model can be designed to perform core super resolution on 3D image stack volumes in a variety of ways, for example:

1) Representing each slice independently as a 2D grayscale image slice and using 2D convolutional units in the model;

2) Representing slices as sequences of 2D composite color image slices where image color channels represent the prior, current, and subsequent slices in the stack as depicted in FIG. 10 and using 2D convolutional units in the model;

3) Representing slices as 3D voxels of data and using 3D convolutional units in the model.

Figure 11:
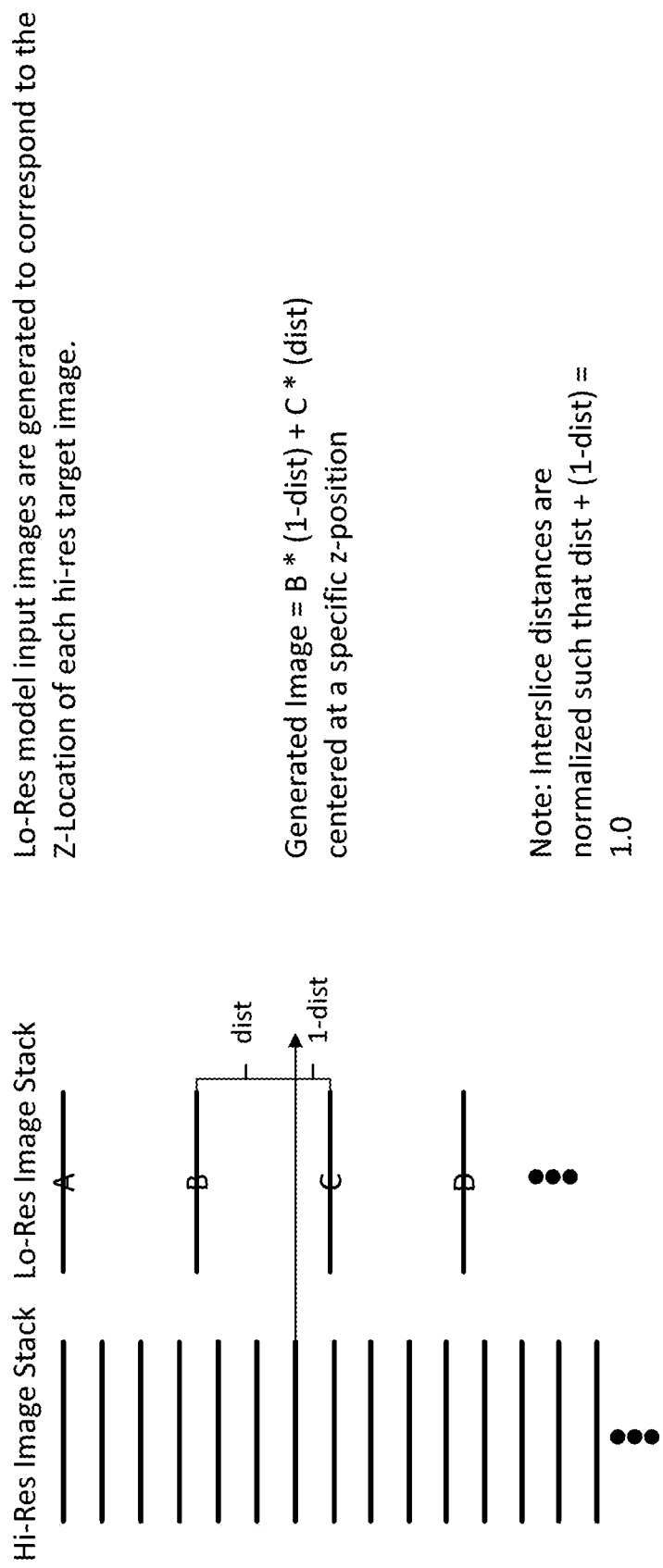
FIG. 11 demonstrates steps of the method of rock property estimation, in accordance with some embodiments.

Regardless of the chosen 3D data and model representation, image slices for any position in the stack can be generated as a weighted combination of the known slices before and after a specific z-location as depicted in FIG. 11. For creating model training data, the low-res image stack is used to generate a low-res image slice for each z-position corresponding to a high-resolution image in the hi-res image stack. Then, the low-resolution/high-resolution image data can be shaped into input/target pairs for 2D grayscale slices, 2D color slices, or 3D volumes to create model training data.

Referring again to FIG. 2, a super resolution model may be trained and tested at operation 13 using the datasets created at operation 12. A super resolution model takes a lower resolution image and generates an enhanced, higher resolution version of the input image. In this application, a super resolution model refers to any computational imaging model capable of performing image-to-image mapping. The model input and output layers will match the size and shape of the input and target training dataset created for the purpose of training the model to perform the image-to-image mapping involved in doing super resolution. The architecture of the internal model layers may employ any the various deep learning architectures such as general multi-layer convolutional models, generative adversarial networks (GANs), U-Net model variants, and related model types capable of performing image-to-image mapping.

The model training process may employ a suitable training regimen associated with the model architecture employed including but not limited to supervised learning, unsupervised learning, semi-supervised learning, transfer learning, generative-adversarial learning and may employ commonly used strategies to avoid overfitting during training such as early stopping, batch normalization, dropout, weight decay, and other related methods.

The determination of whether the result is accurate enough may be done with a user-defined threshold or by allowing the model to identify it. If the model is not accurate enough, more image data may be acquired or added (operation 15), data may be augmented (operation 16), and/or the model architecture may be modified (operation 17). Each of the optional operations 15, 16, and 17 may be used individually or in any combination.

The conditioned core model can be used to generate refined core images at the high resolution desired from new images at operation 14. As new rock samples are acquired and imaged, the trained super resolution model can be applied in order to a generate an enhanced resolution version of a given core image slice or image stack volume involves multiple steps as depicted in FIG. 13.

For a single image slice, a typical sequence of steps may include:
  Resizing the image using interpolation to a given target size based on the desired level of resolution improvement
  Chopping the image into smaller sub-images for processing by the model. Sub-images may be overlapping or non-overlapping.
  Using the model to generate a resolution-enhanced version of each sub-image
  Re-assembling the generated sub-images into a unified, resolution-enhanced whole image
For an image stack, a z-positioned image slice or volume is created at each z-location to match the desired resolution enhancement then 2D slice sub-images or 3D sub-volumes are extracted for processing by the model. The model is used to generate resolution-enhanced sub-images/sub-volumes which are then assembled into a unified 3D volume image stack.

Figure 12:
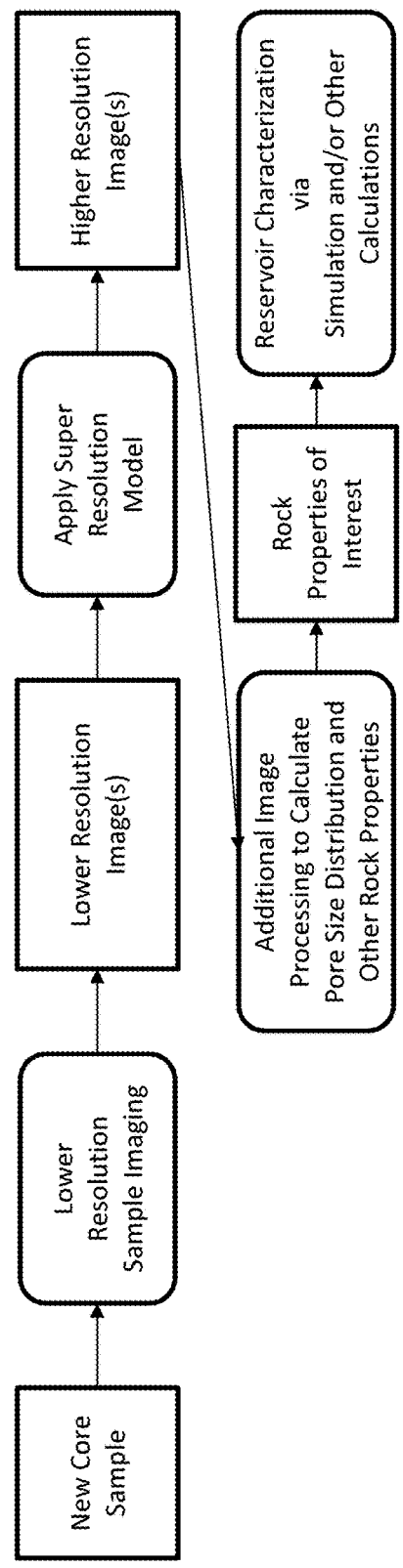
FIG. 12 demonstrates steps of the method of rock property estimation, in accordance with some embodiments.
Figure 13:
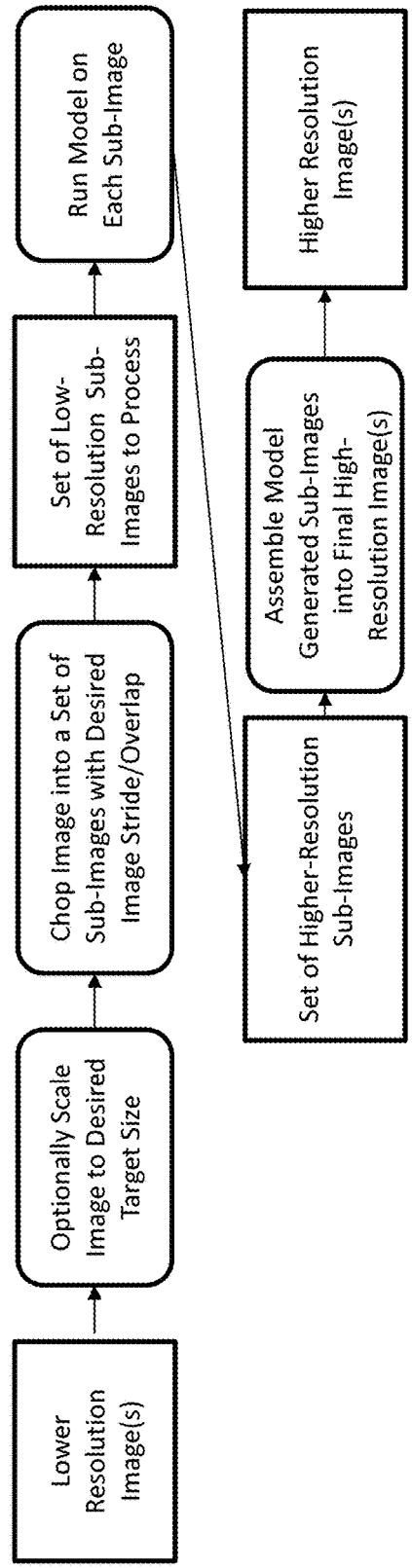
FIG. 13 demonstrates steps of the method of rock property estimation, in accordance with some embodiments.

FIG. 12 and FIG. 13 illustrate how the trained super resolution model can be used to generate higher resolution images that can be used to estimate rock properties.

Figure 14:
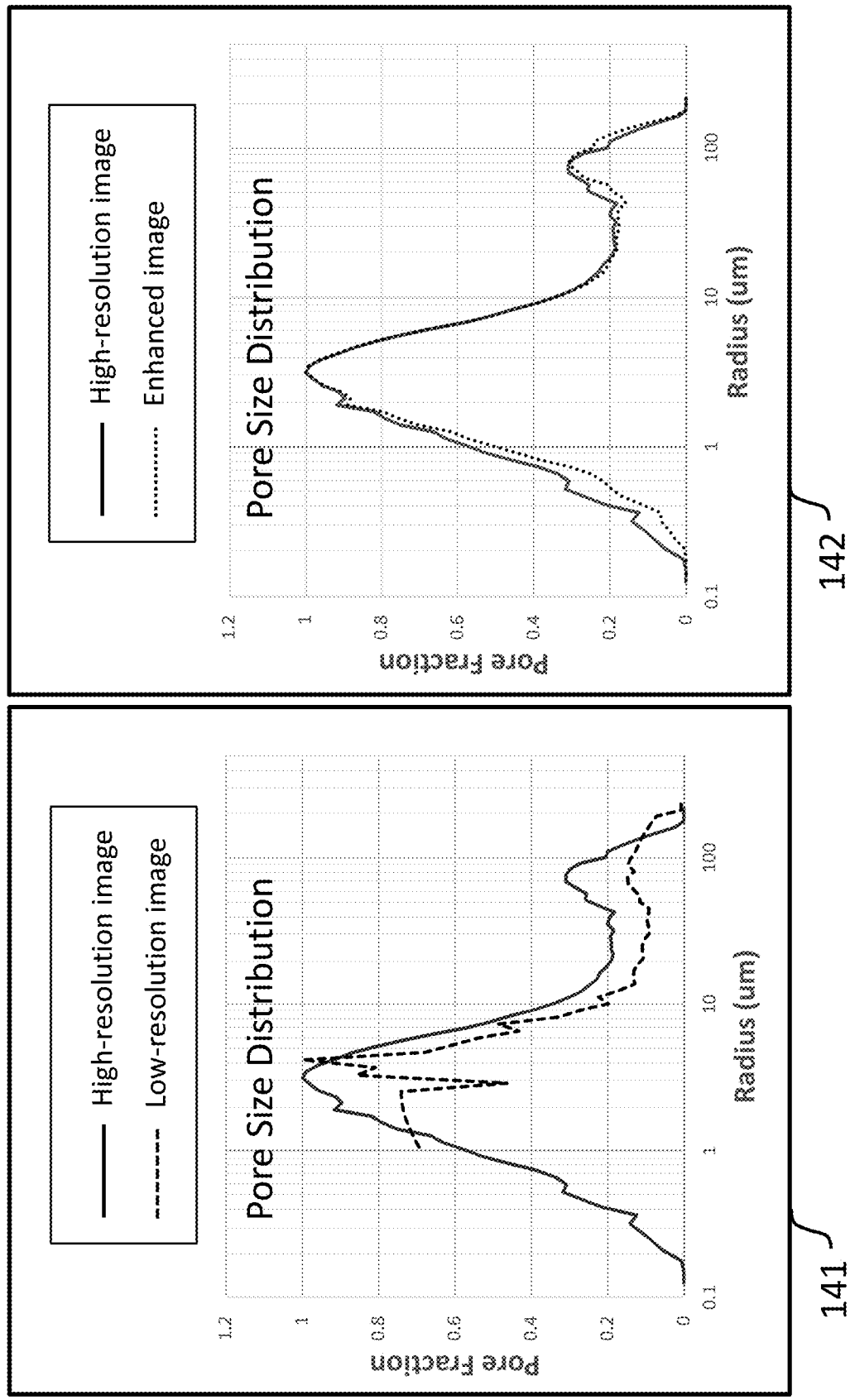
FIG. 14 demonstrates improved rock property estimation results of the model-enhanced method of rock property estimation, in accordance with some embodiments.

The enhanced images can then be displayed and used for improved rock property estimations in petrophysical, geological and geomechanical analyses at operation 18 of FIG. 2. FIG. 14 illustrates an example of how rock property estimation can be improved with enhanced images. In this example, the property of interest is pore size distribution, which is a frequency histogram of pore radius in a rock sample. Image 141 demonstrates pore size distribution computed from two images at different resolutions, where the solid line is computed on the high-resolution image, and the dashed line on the low-resolution image. The difference between the two lines shows that low-resolution image cannot yield accurate pore size distribution, because its resolution is not enough to capture fine details in pore structures. After the low-resolution image is enhanced with a trained model, pore size distribution is computed and plotted as the dotted line in image 142. The pore size distribution generated from the enhanced image matches very well with the high-resolution image.

Figure 15:
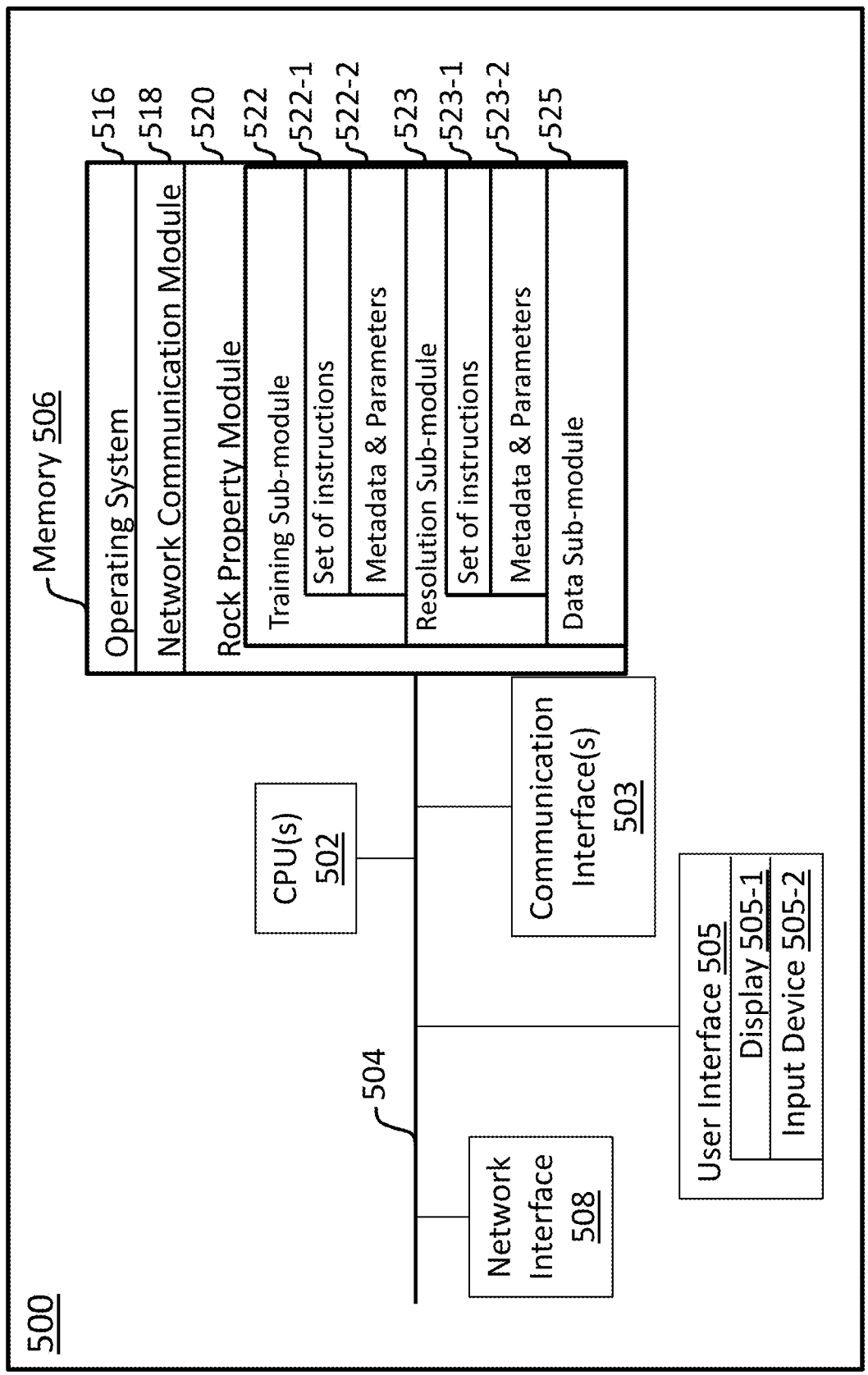
FIG. 15 is a block diagram illustrating a rock property estimation system, in accordance with some embodiments.

FIG. 15 is a block diagram illustrating a rock property estimation system 500, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the rock property estimation system 500 includes one or more processing units (CPUs) 502, one or more network interfaces 508 and/or other communications interfaces 503, memory 506, and one or more communication buses 504 for interconnecting these and various other components. The rock property estimation system 500 also includes a user interface 505 (e.g., a display 505-1 and an input device 505-2). The communication buses 504 may include circuitry (sometimes called a chipset) that interconnects and controls communications between system components. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPUs 502. Memory 506, including the non-volatile and volatile memory devices within memory 506, comprises a non-transitory computer readable storage medium and may store data, velocity models, images, and/or geologic structure information.

In some embodiments, memory 506 or the non-transitory computer readable storage medium of memory 506 stores the following programs, modules and data structures, or a subset thereof including an operating system 516, a network communication module 518, and a imaging module 520.

The operating system 516 includes procedures for handling various basic system services and for performing hardware dependent tasks.

The network communication module 518 facilitates communication with other devices via the communication network interfaces 508 (wired or wireless) and one or more communication networks, such as the Internet, other wide area networks, local area networks, metropolitan area networks, and so on.

In some embodiments, the rock property module 520 executes the operations of method 100. Rock property module 520 may include data sub-module 525, which handles the training data and core image data. This data is supplied by data sub-module 525 to other sub-modules.

Training sub-module 522 contains a set of instructions 522-1 and accepts metadata and parameters 522-2 that will enable it to execute operations 10-13 of method 100. The resolution sub-module 523 contains a set of instructions 523-1 and accepts metadata and parameters 523-2 that will enable it to contribute to operations 14-18 of method 100. Although specific operations have been identified for the sub-modules discussed herein, this is not meant to be limiting. Each sub-module may be configured to execute operations identified as being a part of other sub-modules, and may contain other instructions, metadata, and parameters that allow it to execute other operations of use in processing data and generate the images. For example, any of the sub-modules may optionally be able to generate a display that would be sent to and shown on the user interface display 505-1. In addition, any of the data or processed data products may be transmitted via the communication interface(s) 503 or the network interface 508 and may be stored in memory 506.

Method 100 is, optionally, governed by instructions that are stored in computer memory or a non-transitory computer readable storage medium (e.g., memory 506 in FIG. 15) and are executed by one or more processors (e.g., processors 502) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, method 100 is described as being performed by a computer system, although in some embodiments, various operations of method 100 are distributed across separate computer systems.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for training a model that refines estimated parameter values within core images, the method being implemented in a computer system, the computer system including one or more computer processors and non-transitory electronic storage that stores core image data sets that correspond to boreholes drilled through subsurface volumes of interest, the method comprising:
   a. receiving, at the one or more computer processors, multiple training image pairs wherein each training image pair includes: (i) an unrefined core image of a rock sample to be used for estimating rock properties, and (ii) a refined core image of the same rock sample;
   b. aligning, for said each training image pair, the unrefined core image with the refined core image, wherein the aligning comprises calculating pixel level mean squared error or other image similarity measures in order to change scale, x-y position, or depth of either the unrefined core image or the refined core image such that the mean squared error is minimized or the other image similarity measures are maximized;
   c. generating a training dataset from the multiple training image pairs;
   d. receiving, at the one or more computer processors, an initial core model that is a general multi-layer convolutional model, U-Net model variant, or related model type capable of performing image-to-image mapping;
   e. generating a conditioned core model by training, on the one or more computer processors using the multiple training image pairs, the initial core model; and
   f. storing the conditioned core model in the non-transitory electronic storage.

2. The computer-implemented method of claim 1 wherein the unrefined core image is created by coarsening the refined core image.

3. The computer-implemented method of claim 1 wherein the unrefined core image is an image that was physically imaged at low-resolution and the refined core image is an image that was physically imaged at high-resolution.

4. The computer-implemented method of claim 1 wherein the aligning is done manually or algorithmically using an image registration method.

5. The computer-implemented method of claim 1 wherein the unrefined core image and the refined core image are 2-D and the generating the training dataset includes one or more of cropping the images into sub-images and image interpolation.

6. The computer-implemented method of claim 1 wherein the unrefined core image and the refined core image are 3-D core volumes represented as a stack of 2-D image slices and the generating the training dataset includes one of:
 a. representing each 2-D image slice independently as a 2-D grayscale image slice;
 b. representing slices as sequences of 2-D composite channel image slices wherein image channels represent a prior, a current, and a subsequent slice in the stack; or
 c. representing slices as 3-D multi-channel voxels of data.

7. The computer-implemented method of claim 1, further comprising:
 a. obtaining an initial target core image data set;
 b. applying the conditioned core model to the initial target core image data set to generate a refined target core image data set;
 c. generating an image that represents the refined target core image data set using visual effects to depict at least a portion of the parameter values in the refined target core image data set; and
 d. displaying, on a graphical user interface, or storing, in non-transitory electronic storage, the refined target core image.

8. The computer-implemented method of claim 7, wherein sampling density of the estimated parameter values is higher for the refined target core image data set than the initial target core image data set.

9. A computer system, comprising:
 one or more processors;
 memory; and
 one or more programs, wherein the one or more programs are stored in the memory and configured to be executed by the one or more processors, the one or more programs including instructions that when executed by the one or more processors cause the system to:
  a. receive, at the one or more processors, multiple training image pairs wherein each training image pair includes: (i) an unrefined core image of a rock sample to be used for estimating rock properties, and (ii) a refined core image of the same rock sample;
  b. align, for said each training image pair, the unrefined core image with the refined core image, wherein the aligning comprises calculating pixel level mean squared error or other image similarity measures in order to change scale, x-y position, or depth of either the unrefined core image or the refined core image such that the mean squared error is minimized or the other image similarity measures are maximized;
  c. generate, at the one or more processors, a training dataset from the multiple training image pairs;
  d. receive, at the one or more processors, an initial core model that is a general multi-layer convolutional model, U-Net model variant, or related model type capable of performing image-to-image mapping;
  e. generate a conditioned core model by training, on the one or more processors using the multiple training image pairs, the initial core model; and
  f. store the conditioned core model in non-transitory electronic storage.

10. A non-transitory computer readable storage medium storing one or more programs, the one or more programs comprising instructions, which when executed by an electronic device with one or more processors and memory, cause the device to:
 a. receive, at the one or more processors, multiple training image pairs wherein each training image pair includes: (i) an unrefined core image of a rock sample to be used for estimating rock properties, and (ii) a refined core image of the same rock sample;
 b. align, for said each training image pair, the unrefined core image with the refined core image, wherein the aligning comprises calculating pixel level mean squared error or other image similarity measures in order to change scale, x-y position, or depth of either the unrefined core image or the refined core image such that the mean squared error is minimized or the other image similarity measures are maximized;
 c. generate, at the one or more processors, a training dataset from the multiple training image pairs;
 d. receive, at the one or more processors, an initial core model that is a general multi-layer convolutional model, U-Net model variant, or related model type capable of performing image-to-image mapping;
 e. generate a conditioned core model by training, on the one or more processors using the multiple training image pairs, the initial core model; and
 f. store the conditioned core model in non-transitory electronic storage.

* * * * *